United States Patent [19]

Rexer

[11] 4,000,026
[45] Dec. 28, 1976

[54] METHOD AND CEMENT FOR BONDING CARBON ARTICLES

[75] Inventor: Joachim Rexer, Brecksville, Ohio

[73] Assignee: Union Carbide Corporation, New York, N.Y.

[22] Filed: Mar. 12, 1973

[21] Appl. No.: 340,288

[52] U.S. Cl. .................. 156/49; 228/121; 75/138; 75/148; 313/357; 252/512; 156/158; 156/325

[51] Int. Cl.$^2$ ..................... B23K 31/02

[58] Field of Search ............ 75/138, 148, 0.5 R; 252/512; 313/3, 234, 357; 156/49, 157, 158, 304; 29/472.7, 504, 182.5, 182.7, 182.8; 117/228, DIG. 11

[56] References Cited

UNITED STATES PATENTS

| | | | |
|---|---|---|---|
| 2,862,748 | 12/1958 | Bailey et al. | 117/228 |
| 2,979,814 | 4/1961 | Steinber | 29/472.7 |
| 3,016,311 | 1/1962 | Stackhouse | 29/182.5 |
| 3,097,931 | 7/1963 | Davidson et al. | 29/472.7 X |
| 3,177,577 | 4/1965 | Fujimura | 29/472.7 |
| 3,196,536 | 7/1965 | Knippenberg | 29/472.7 |
| 3,425,116 | 2/1969 | Crooks | 29/472.7 |
| 3,553,010 | 1/1971 | Kubisch | 117/228 X |
| 3,584,370 | 6/1971 | Moore et al. | 29/504 X |
| 3,609,856 | 10/1971 | Eckert | 29/504 X |
| 3,717,926 | 2/1973 | Anikin et al. | 29/472.7 |
| 3,770,488 | 11/1973 | Pepper et al. | 57/164 X |

FOREIGN PATENTS OR APPLICATIONS 695,470 10/1964 Canada ............ 29/472.7

*Primary Examiner*—Richard E. Schafer
*Attorney, Agent, or Firm*—J. Hart Evans

[57] ABSTRACT

A high temperature cement for carbon articles comprising aluminum, and tantalum or silicon, in a specific weight percent ratio such that when heated in an inert atmosphere, the tantalum or silicon will react with the carbon in the articles to be joined to form, in situ, tantalum carbide or silicon carbide, respectively, in the presence of aluminum.

6 Claims, No Drawings

METHOD AND CEMENT FOR BONDING CARBON ARTICLES

DESCRIPTION OF THE PRIOR ART

Graphite electrodes, as used in electric furnaces and like equipment, are consumed in use and therefore must be fed into a furnace continuously if the furnace is to operate without interruptions. In order to facilitate this continuous feed, the electrode sections are usually joined at their end faces during the operation of the furnace. In this manner, the end face of a new electrode can be joined to the end face of an electrode being consumed thereby providing a continuous feed operation.

The common or contact area between the end faces of the electrode sections is referred to as the electrode joint and the overall joined electrode sections is referred to as the electrode column.

Various methods for joining electrode sections have been devised of which the threaded nipple connection is the most popular. Although many ways are available for effecting an electrode joint between two electrode sections, a major problem still prevailing in the electrometallurgy industry is the fact that sometimes the electrode joint has a tendency to crack and even rupture during use. This cracking or breaking at the electrode joint may be caused by stresses set up by vibrations, thermal and mechanical shock or other causes.

When employing the threaded nipple connection technique, it has been found that the large tolerance prevailing in the fabrication of the nipple and in the machining of the female recess in the electrode sections result in less than half of the nipple's cylindrical surface being in contact with the corresponding surface of the electrode sections. In addition, a substantial portion of the end faces of mating electrode sections do not make good electrical contact when joined together. This large non-contacting surface area presents a very poor conductance path for the current flow through the electrode column and results in the setting up of temperature gradients across the cross-section of the joint.

Since it is known that materials have different coefficients of expansion, the nipple and the electrode sections expand different amounts when exposed to the high operating temperatures of the electric furnace and thereby cause corresponding thermal stress build up which sometimes causes cracks, splits and even rupture of the joint.

In addition to possible splits and even rupture of the joint, the non-contacting surface area between electrode end face sections and between the nipple and electrode sections cause a higher resistance at the joint than at other points along the electrode column. This increased resistance at the joint causes electrical power to be consumed in the form of wasted heat during the operation of the furnace thus decreasing the efficiency of the electrometallurgical process being performed.

Of additional interest is the fact that the mechanical strength of threaded nipple joints depends primarily on the mechanical properties of the threaded nipple. The flexural strength of such a joint connection is relatively weak and when the joint connection is exposed to the high temperatures which exist in electric furnaces, the end faces of the electrode sections usually separate at the joint causing the relaxation of the surface-to-surface contact thereby aggravating the problems associated with the non-contacting surface area of the joint.

To remedy this situation of weak flexural strength and non-contacting surface area of the joint, it has been proposed to use threaded nipples containing reservoirs of pitch as the connecting means for electrode sections. As described in U.S. Pat. No. 2,828,162, a pitch reservoir, containing a bonding material, is located adjacent each end of a nipple so that when the electrode sections are joined and heated, the bonding material will melt and be forced to substantially fill a preselected area of the total threaded surface.

Another remedy proposed to alleviate the problem of having a large non-contacting surface area between the electrode sections and the nipple is to have the screw threads of the nipple coated with a metal. By doing this, the conductivity would increase since the metal is usually more conductive than the carbon on which it is coated. However, when the electrode joint so formed is heated, the metal melts and sometimes flows away from the screwed threads leaving the joint with slight spaces between the nipple and electrode sections.

A recently issued U.S. Pat. No. 3,429,759, discloses another remedy for the problem of having a non-uniform electrical resistance along the length of an electrode column and specifically across the electrode joint of the column. The crux of the disclosure is in the use of a high temperature cement, composed of prereacted titanium diboride powder mixed with a carbonizable binder, on the end faces of electrode sections to be joined. The cement, after being properly cured, provides a relatively good bonding means for the electrode sections. U.S. Pat. No. 3,657,592 discloses a high temperature cement for joining electrode sections that comprises elemental powders of boron and a transition metal, and a carbonizable binder. The cement joint is initially heated to thermoset the carbonizable binder and then further heated to react the transition metal with the boron to form a strong cemented bond having a good thermal and electrical properties.

The present invention relates to a high temperature cement for joining carbonaceous articles such as electrodes, which comprises aluminum and tantalum or silicon, and whereby said tantalum or silicon is reacted with carbon, in situ, to form tantalum carbide or silicon carbide, respectively.

SUMMARY TO THE INVENTION

The invention comprises a high temperature cement for use in joining electric-furnace electrodes, and a process for applying it. The cement comprises aluminum and a member selected from the group consisting of tantalum, tantalum-aluminum compounds, silicon and silicon-aluminum alloys, and wherein said tantalum is present in a weight percent between about 5 and about 75, preferably between about 20 and 50, and said silicon is present in a weight percent between about 5 and about 50 per cent, preferably between about 7 and 30. The weight percentage, as used in this specification, is based on the total weight of aluminum plus the tantalum or silicon.

When the cement contans tantalum, it can be deposited on end faces of mating carbon electrode sections and heated in an inert atmosphere above about 850° C. whereupon the tantalum will react with the carbon, in situ, to form tantalum carbide. Since the aluminum-silicon eutectic melts at about 580° C., then when using a cement containing silicon, it can be deposited on end fases of mating carbon electrode sections and heated in an inert atmosphere above about 600° C. whereupon the silicon will react with the carbon, in situ, to form silicon carbide. In each case a strong bond is affected between the aluminum and the carbon, and consequently between the carbon electrode sections. The tensile strength of the joint so formed will be much greater than that of the comparable uncemented joint and the conductance across the joint will be greatly increased so as to provide more umiform thermal and electrical properties throughout the electrode column. This increase in conductance decreases the high temperature gradients normally developed in the end faces of the electrode sections of the joint thus greatly reducing the likelihood of cracks and splits being formed thereat. Since these cracks and splits are usually aggravated during their movement toward the tip of the electrode, and sometimes even result in the complete fracture of the joint, their substantial elimination results in an optimum economical use of the electrode column in electrometallurgical processes.

The components of the high temperature cement of this invention comprises aluminum and either tantalum or silicon; each of which should preferably be in the powder form. The size of the particles of the powder is variable with the maximum size depending on the thickness of the cemented joint formed. However, a particle size less than about 50 microns would be preferable.

A mixture of aluminum and tantalum within the above weight per cent range can be prepared by mixing elemental powders of aluminum and tantalum or by mixing elemental powders of aluminum and/or tantalum with an aluminum-tantalum compound, such as $TaAl_3$. In a similar manner, elemental powders of silicon, aluminum, and/or aluminum-silicon alloys can be used to form a mixture of silicon and aluminum within the above weight per cent range. A brazing flux, such as Alcoa No. 33 supplied by Aluminum Company of America, can be added to the mixture of acqueous slurry so that the cement can be easily applied to the end faces of carbon electrodes. The function of the flux in such a case would be to promote wetting and remove undesirable oxides from the surfaces of the cement particles.

As used herein, carbon is intended to mean both graphitic and non-graphitic carbon since the cement of this invention is admirably suited for both types of carbon. Also as used herein, an inert atmosphere is intended to mean a non-oxidizing atmosphere or vacuum.

The minimum temperature for reacting tantalum to carbon, in situ, in the presence of Al to form a good bond between carbon articles was found to be about 850° C. when held for a perod of about 1 hour, while an upper temperature of about 1300° C. was found to be sufficient when held for a period of minutes. Thus exposing an aluminum-tantalum cement-applied joint of carbon sections to a heat treatment in an inert atmosphere at a temperature between about 850° and about 1300° C., for a time period between about 1 minute and about 1 hour, will be sufficient to produce a strong bond between said sections. It is also feasible to apply the cement of this invention on the end faces of electrode sections which are being fed into an operating furnace so that the heat generated by the furnace, usuaally at a temperature above about 600° C., can be utilized to effect the necessary reactions of the components of the cement. The cement can be supplied to the end faces of nipple connected electrode sections fed into an electric furnace since the threaded connection will provide sufficient pressure at the joint of the faces to secure adequate conact between such end faces during exposure to the high temperatures which exist in the furnace. The necessary reaction of the components of the cement will consequently occur thereby forming a strong and secure joint for the electrode sections. Thus, the normal feed of electrode sections into an operating electric furnace can be maintained while using the cement of this invention.

The temperature required for the reaction of silicon and carbon, in situ, to yield silicon carbide in the presence of aluminum can vary between about 580° and about 1300° C. when held for a period of time between about 5 minutes and about 1 hour. Again, as stated above, the heat of an operating electric furnace can be utilized to effect the necessary reactions of the components of the silicon-aluminum cement.

The thickness of the cement layer between the end faces of electrode sections is somewhat critical and should not exceed about 0.010 inch. A suitable thickness range between about 0.001 and about 0.005 is preferred for joining electrode sections. Elemental aluminum, aluminum compounds or commercial aluminum alloys, for example those containing silicon, copper, magnesium, manganese, etc., can be effectively utilized in the cement of this invention. The use of a fine particle size tantalum powder would be preferrable in the process and cement of this invention because the fine particle size would expedite the solution rate of the tantalum in the aluminum since a solution of tantalum metal in aluminum precedes the formation of tantalum carbide. Tantalum powder sized between about 200 Tyler mesh and finer would be suitable according to this invention while a size about 325 Tyler mesh and finer would be preferable. Likewise, the silicon particle size should be small to expedite solution in the aluminum and permit the application of a thin smooth layer of the powder to the electrode end face surfaces. Therefore, silicon powder sized about 200 Tyler mesh and finer would be suitable according to this invention while a size about 325 Tyler mesh and finer would be preferable. When using a compound of aluminum-tantalum or an aluminum-silicon alloy, the particle size should preferably be within the size range specified above.

One process for joining carbon electrode sections together, is to first prepare a mixture of aluminum with either tantalum or silicon powders in the weight ratio and in the size specified above. An aqueous slurry of the mixture may be made to facilitate the depositing of the cement onto at least one clean surface of the carbon sections to be joined. A brazing flux may also be added for the reasons stated above. The mixture or slurry can be applid to the carbon surface by any known method such as painting, spraying, dipping, rolling or the like. After the cement is deposited to a layer thickness within the range specified above, the assembled opposed end faces of the carbon sections are heated in an inert atmosphere to above about 600° C when using silicon, or 850° C when using tantalum, for a time period of at least about 1 minute. This heat treatment will react the tantalum or silicon with the carbon of the electrode sections thereby forming tantalum carbide or silicon carbide, in situ, respectively, which will serve as an interface layer to chemically bond the aluminum to the carbon of each end face surface. The cemented joint, so formed, will have a tensile strength characteristic that will be much greater than that of the comparable uncemented joint while simultaneously exhibiting good thermal and electrical properties.

The following examples will serve to illustrate the invention but are not intended to limit the scope of the invention in any way.

EXAMPLE I

Grade ATJ graphite electrode cylindrical sections, measureing 2 inches in diameter by 2½ inches high, were machined with a ¾-inch diameter, 1-inch deep female threaded recess in one of its end faces. The threads of the recess were spaced 10 to the inch to accommodate a cylindrical threaded straight nipple. In assembling two sections together, a 2-inch threaded nipple was screwed into the female recess in one section and then a second section was screwed onto the projected portion of the nipple which extended from the first section. The end faces of some electrode sections were machined with a sprial groove which started at the threaded recess and extended spirally outward to the periphery of the cylindrical electrode. The spiral groove, so formed, provided a channel into which excess cement could flow once two sections were connected by a threaded nipple. This provided a means for limiting the thickness of the layer of cement applied at the end faces of two electrode sections, since any excess cement could be squeezed out of the joint by merely tightening the joint.

An aqueous cement slurry was prepared by mixing 50 w/o powdered aluminum, sized 325 Tyler mesh and finer, with 50 w/o powdered TaAl$_3$, sized 325 Tyler mesh and finer, to which 30 pph of a brazing flux was added. The brazing flux known as Flux No. 33 was obtained commercially from the Aluminum Company of America.

The female threaded end faces of a set of spiral grooved electrodes, or a set of smooth faced electrodes, were brush painted with the cement slurry. One half of a nipple was then secured into one electrode whereupon the second electrode of the set was attached to the extended second half portion of the nipple thereby securing the electrodes at their threaded end faces. Each set of assembled electrodes was then inductively heated in a quartz furnace to 1300° C within 30 minutes under flowing argon. When 1300° C was obtained, the furnace power was shut off and the electrodes were furnace cooled.

Each set of cemented electrode sections was then tested for electrical resistance and breaking load capacity. The electrical resistivity of each electrode set, including a solid piece of ATJ graphite, was measured by determining the potential drop across a 10 cm span (includes the joint) when 1 amp. current is flowing. The tensile breaking load capacity of each electrode set was determined by using a Baldwin testing machine in which a set of cemented electrode sections was held and aligned in the machine by means of holders, each of which was epoxy cemented to one of the non threaded ends of the electrode assembly. The machine then imparted a tensile load on the electrode assembly at the rate of 500 lbs/minute until the cemented electrode assembly broke at the joint. The results for several sets of cemented electrode assemblies are shown in Table 1.

TABLE I

| TEST NO. | BONDING CEMENT | CEMENTED JOINT THICKNESS, (in.) | JOINT END FACES | UNBONDED | | BONDED | |
|---|---|---|---|---|---|---|---|
| | | | | ELECTRICAL* RESISTIVITY | BREAKING LOAD (lbs.) | ELECTRICAL* RESISTIVITY | BREAKING LOAD (lbs.) |
| 1** | — | — | — | 1623 | — | — | — |
| 2 | None | — | Spiral | 1880 | 540 | — | — |
| 3 | None | — | Spiral | 2021 | 510 | — | — |
| 4 | 50 w/o Ta Al$_3$ + 50 w/o Al + 30 pph flux | <0.010 | Spiral | 2060 | — | 1785 | 2820 |
| 5 | " | " | Spiral | 2077 | — | 1781 | 1580 |
| 6 | " | 0.025 – 0.050 | Smooth | — | — | 1930 | 600 |
| 7 | " | 0.025 – 0.050 | Smooth | — | — | 1940 | 900 |

*Electrical resistivity measured in micro-ohm - cm.
**Solid ATJ graphite stock.

Using the test results of the unbonded electrode sections (tests 2 and 3) as a reference, the test data shows that the joint strengths of the bonded electrode sections (tests 4 and 5) were increased about 450 and 200 percent, respectively. The slight increase in the strength of the joints of the bonded electrode sections of tests 6 and 7 over the unbonded electrode sections (tests 2 and 3) could be due to the fact that the thickness of the cemented layer at each joint was rather high.

EXAMPLE II

Using the same size and grade graphite electrode cylindrical sections as in Example I, the end faces of several set of electrode sections were coated with various mixtures or slurries of bonding cement as shown in Table II. The cement applied electrode assemblies were then heated, cooled, and tested as described in Example 1. The heat treated bonded joint cement, of each set of electrode sections, was estimated to be less than 0.010 inch thick. The test data for each cement bonded electrode assembly is shown in Table II.

TABLE II

| Test No. | Bonding Cement | Joint End Faces | Unbonded Electrical Resistivity* | Bonded Electrical Resistivity* | Bonded Breaking Load (lbs.) |
|---|---|---|---|---|---|
| 1 | **Al/Si | Smooth | 1707 | 1658 | 2790 |
| 2 | **Al/Si | Spiral | 1735 | 1642 | 2710 |
| 3 | ***TaAl$_3$ | Smooth | 1716 | 2203 | 706 |
| 4 | ***TaAl$_3$ | Spiral | 1890 | 2425 | 540 |
| 5 | Al + Flux | Smooth | 1675 | 2369 | 560 |
| 6 | { 50 w/o TaAl$_3$ 50 w/o Al } | Smooth | 1635 | 1579 | 1845 |

TABLE II-continued

| Test No. | Bonding Cement | Joint End Faces | Unbonded Electrical Resistivity* | Bonded Electrical Resistivity* | Bonded Breaking Load (lbs.) |
| --- | --- | --- | --- | --- | --- |
| 7 | 50 w/o Al<br>50 w/o Ta Al₃ | Spiral | 1863 | 1522 | 2230 |
| 8 | Coal tar Pitch<br>30 Hard | Smooth | 1905 | 1796 | 780 |

*Electrical resistivity measured in micro ohm centimeters.
**Al/Si eutectic — 11.5% w/o Si + 88.5% w/o Al.
***TaAl₃ is 31.% w/o Al + 69% w/o Ta.

As demonstrated by the test data in Table II, aluminum-silicon eutectic (tests 1 and 2) can be used as a cement for bonding carbon electrode end faces together. The test data shown for tests 3 and 4 demonstrates that an aluminum tantalum mixture containing 69% w/o Ta would not effectively provide a superior bonded joint for carbon electrode sections while a mixture containing 34.5% w/o Ta (tests 6 and 7) would be very effective in providing a strong bonded joint for carbon electrodes.

Although these examples are directed to carbon electrode sections, it is to understood that the cement of this invention can be used for joining all types and shapes of carbon articles.

What is claimed is:

1. A method for joining carbon articles comprising:
   a. preparing a cement consisting essentially of a mixture of aluminum and a member selected from the group consisting of tantalum, tantalum-aluminum compounds, silicon and silicon-aluminum alloys, wherein said tantalum is present in a weight percent between about 5 and about 75, or said silicon is present in a weight percent between about 5 and about 50;
   b. providing the article to be joined with substantially clean opposed surfaces;
   c. providing up to a 0.010 inch thick layer of said cement on at least one of said opposed surfaces to be joined;
   d. joining said opposed faces to form a joint; and
   e. heating said cement-applied joint to a temperature below 1300° C and for a time period sufficient to react the said member with carbon article to form a carbide in the presence of aluminum.

2. The method of claim 1 wherein said articles to be joined are electrodes and the thickness of said applied cement layer is between about 0.001 and about 0.010 in.

3. A method according to claim 1 wherein the cement prepared in step (a) said aluminum and said member are size 200 tyler mesh and finer.

4. A method according to claim 1 wherein in the cement prepared in step (a) said tantalum is present in a weight percent between 20 and about 50.

5. A method according to claim 1 wherein in the cement prepared in step (a) said silicon is present in a weight percent between about 7 and about 30.

6. A method according to claim 1 wherein in the cement prepared in step (a) said silicon is present in a weight percent of about 11.5 percent.

* * * * *